United States Patent [19]
Gingerich et al.

[11] Patent Number: 6,113,808
[45] Date of Patent: Sep. 5, 2000

[54] ELECTROLUMINESCENT PHOSPHOR WITH EXTENDED LIFE AND METHOD OF MAKING SAME

[75] Inventors: Richard G. W. Gingerich; Clarence D. Vanderpool, both of Towanda, Pa.

[73] Assignee: Osram Sylvania Inc., Danvers, Mass.

[21] Appl. No.: 09/215,481

[22] Filed: Dec. 18, 1998

[51] Int. Cl.[7] .............................. C09K 11/54; C09K 11/56
[52] U.S. Cl. ........................................................ 252/301.65
[58] Field of Search ......................... 252/301.4 R, 301.65

[56] References Cited

U.S. PATENT DOCUMENTS 3,657,142   4/1972   Poss ................................... 252/301.6 S

FOREIGN PATENT DOCUMENTS 7-305057   11/1995   Japan .

Primary Examiner—C. Melissa Koslow
Attorney, Agent, or Firm—William H. McNeill

[57] ABSTRACT

An electroluminescent phosphor containing an effective amount of bismuth to increase the half-life of the phosphor compared to the half-life of the phosphor without the bismuth. The phosphor is produced by the method comprising the steps of preparing the electroluminescent phosphor; adding granular, elemental bismuth to the bottom of a quartz reaction vessel; covering the bismuth with a layer of quartz wool; placing the phosphor on top of the quartz wool; evacuating the reaction vessel to about 750–760 mm Hg and sealing the vessel; and heating the vessel to between about 500 to 700° C. for about 24 to 72 hours.

3 Claims, No Drawings

ELECTROLUMINESCENT PHOSPHOR WITH EXTENDED LIFE AND METHOD OF MAKING SAME

TECHNICAL FIELD

This invention relates to electroluminescent phosphors and more particularly to a long life zinc sulfide based electroluminescent phosphor. While the phosphor of the present invention can be produced to 'emit light in a broad spectrum of colors, the present invention is particularly suited to phosphors emitting in the blue and blue-green portions of the spectrum. Still more particularly, the present invention relates to an electroluminescent phosphor that, when incorporated into a lamp, has an unexpectedly long life.

BACKGROUND ART

Electroluminescent phosphors, particularly those based on zinc sulfide, and the methods of manufacturing the same, are known. The most common types emit in the blue and green portions of the spectrum. The green emitting phosphors have a longer half-life (i.e., the time at which the brightness is one half the initial brightness), typically in the range of about 10–1000 hours when operated at 100 volts at 400 Hz. The half-life is shortened when the lamps are operated at higher voltages, frequencies or temperatures.

Typically, zinc sulfide electroluminescent phosphors have been prepared by preparing a mixture of predominantly ZnS with about one weight percent (wt. %) of a copper compound such as $CuSO_4$, and a few wt. % of a halide co-activator as a fluxing compound. This mixture was then fired at a temperature of from 1000 to 1200° C. for 4 to 6 hours and, after cooling, washed to remove the flux. The washed material was then stressed (for example, by milling or mulling) and then refired at 600 to 950° C.

When a thusly-prepared phosphor was subsequently fired in vacuo at a temperature of 500° C. for 72 hours the half-life was determined to be 390 hours.

It would be an advance in the art if the half-life of electroluminescent phosphors could be extended.

DISCLOSURE OF INVENTION

It is, therefore, an object of the invention to obviate the disadvantages of the prior art.

It is another object of the invention to enhance electroluminescent phosphors.

Yet another object of the invention is the provision of an electroluminescent phosphor having an extended half-life.

Still another object of the invention is the provision of a method of making an electroluminescent phosphor having an extended half-life.

These objects are accomplished, in one aspect of the invention, by the provision of an electroluminescent phosphor containing an effective amount of bismuth to increase the half-life of the phosphor compared to the half-life of the phosphor without the bismuth.

The method of increasing the half-life of an electroluminescent phosphor comprises the steps of preparing the electroluminescent phosphor; adding granular, elemental bismuth to the bottom of a quartz reaction vessel; covering the bismuth with a layer of quartz wool; placing the phosphor on top of the quartz wool; evacuating the reaction vessel to about 750–760 mm Hg and sealing the vessel; and heating the vessel to between about 500 to 700° C. for about between 24 to 72 hours.

The half-life of phosphors so treated is substantially increased.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Referring now to the invention with greater particularity, an electroluminescent phosphor has incorporated therein, in vacuo, an amount of bismuth sufficient to increase the half-life. The amount of bismuth comprises from about 0.007 to about 0.02 wt. % of the phosphor.

EXAMPLE

Four grams of elemental bismuth metal, in granular form, were placed at the bottom of a thick-walled quartz tube. The layer of bismuth was then covered with a layer or plug of quartz wool. An amount of previously prepared ZnS electroluminescent phosphor, such for example, of a Type 723 available from Osram Sylvania Inc. of Towanda, Pa., was place on the top of the plug of quartz wool. A suitable amount is from 25 to 40 grams. The tube was evacuated to approximately 750–760 mm of Hg and sealed. The tube was heated to 500° C. in some instances and 700° C. in other instances for about 24 to 72 hours. The phosphors produced thereby were incorporated into lamps and tested. The results are shown in Table I.

TABLE I

| Sample Number | Bi | Temp °C. | Time Hours | Color X | Y | Light Output (Ft.L) 24 Hrs | 100 Hrs | Half-Life Hours |
|---|---|---|---|---|---|---|---|---|
| 1 | Vac. | 500 | 72 | 0.193 | 0.471 | 31.1 | 23.9 | 390 |
| 2 | .007% | 500 | 24 | 0.192 | 0.465 | 30.3 | 24.6 | 462 |
| 3 | .02% | 500 | 72 | 0.191 | 0.463 | 29.4 | 26.6 | 1118 |
| 4 | .02% | 700 | 72 | 0.184 | 0.428 | 14.2 | 13.2 | 1408 |

Sample 1 in the above Table I was a standard Osram Sylvania Type 723, ZnS:CuCl, fired in vacuo for 72 hours to use as a control. Samples 2–4 were similarly fired by the method of the Example and included the noted amounts of bismuth additive. It will be seen from Table I that the bismuth increased the half-life of the electroluminescent phosphors dramatically, with little loss in light output (measured in foot lamberts {Ft.L.})

Accordingly, there is here provided an electroluminescent phosphor with increased half-life, which increase allows for the manufacture of electroluminescent lamps that are greatly enhanced over the prior art.

While there have been shown and described what are at present considered the preferred embodiments of the invention, it will be apparent to those skilled in the art that various changes and modifications can be made herein without departing from the scope of the invention as defined by the appended claims.

What is claimed is:

1. An electroluminescent phosphor comprised of ZnS:CuCl and containing an effective amount of bismuth to increase the half-life of said phosphor compared to the half-life of said phosphor without said bismuth.

2. The electroluminescent phosphor of claim 1 wherein said bismuth is present in an amount of about 0.001 to 0.03 wt. %.

3. A method for increasing the half-life of a ZnS:CuCl electroluminescent phosphor, comprising the steps of: preparing said electroluminescent phosphor; adding granular, elemental bismuth to the bottom of a quartz reaction vessel; covering said bismuth with a layer of quartz wool; placing said phosphor on top of said quartz wool; evacuating said reaction vessel to about 750–760 mm Hg and sealing said vessel; and heating said vessel to between about 500 to 700° C. for about 24 to 72 hours.

* * * * *